United States Patent [19]

Jaffard et al.

[11] Patent Number: 5,724,201
[45] Date of Patent: *Mar. 3, 1998

[54] METHOD AND APPARATUS FOR REDUCING TRANSITION TIME FOR A MAGNETIC HEAD TO SWITCH FROM A WRITE MADE TO A READ MODE BY REDUCING A MAXIMUM CURRENT VALUE AT DIFFERENT RATES

[75] Inventors: Jean-Luc Jaffard, Saint Egreve; Yann Desprez-Le Goarant, Grenoble, both of France

[73] Assignee: SGS-Thomson Microelectronics S.A., Saint Genis, France

[*] Notice: The term of this patent shall not extend beyond the expiration date of Pat. No. 5,483,390.

[21] Appl. No.: 571,760

[22] Filed: Dec. 13, 1995

Related U.S. Application Data

[63] Continuation of Ser. No. 100,665, Jul. 30, 1993, Pat. No. 5,483,390.

[30] Foreign Application Priority Data

Jul. 31, 1992 [FR] France .................. 92 09798

[51] Int. Cl.⁶ .................................................. G11B 15/12
[52] U.S. Cl. .................................................. 360/62; 360/46
[58] Field of Search .................................. 360/46, 62, 67, 360/45, 64, 61, 68, 66; 358/335

[56] References Cited

U.S. PATENT DOCUMENTS

| | | | |
|---|---|---|---|
| 4,063,293 | 12/1977 | Perahia | 360/62 |
| 4,868,691 | 9/1989 | Kawasaki | 360/62 |
| 4,926,271 | 5/1990 | Aoki et al. | 360/62 |
| 5,122,899 | 6/1992 | Kaji | 360/62 X |
| 5,168,395 | 12/1992 | Klassen et al. | 360/46 |
| 5,357,379 | 10/1994 | Gower | 360/62 X |

FOREIGN PATENT DOCUMENTS

A-0455438 11/1991 European Pat. Off. .
410204 1/1992 Japan .

OTHER PUBLICATIONS

French Search Report from French Patent Application 92 09798, filed Jul. 31, 1992.
Patent Abstracts of Japan, vol. 12, No. 002 (P652), Jan. 7, 1988, & JP-A-62164201 (Fuji Photo Film Co., Ltd. Jul. 20, 1987.
Patent Abstracts of Japan, vol. 15, No. 420 (P-1267), Oct. 24, 1991 & JP-A-3171403 (Fujitsu Ltd.) Jul. 24, 1991.

*Primary Examiner*—Aristotelis M. Psitos
*Assistant Examiner*—Patrick Wamsley
*Attorney, Agent, or Firm*—Wolf, Greenfield & Sacks, P.C.; James H. Morris

[57] ABSTRACT

A device for switching a read head from a write mode to a read mode includes a voltage ramp generating circuit, generating and outputting a voltage ramp after a write operation; a variable current source for discharging an initial current of the read head, wherein a current output by the current source is controlled proportionally to the slope between the beginning of the voltage ramp and a first threshold of the ramp, the current source having an initial maximum value higher than the initial current of the head; and an accentuating circuit for accentuating the ramp slope between the beginning of the ramp and a time when the current output by the variable current source becomes equal to the initial current present in the head.

7 Claims, 4 Drawing Sheets

METHOD AND APPARATUS FOR REDUCING TRANSITION TIME FOR A MAGNETIC HEAD TO SWITCH FROM A WRITE MADE TO A READ MODE BY REDUCING A MAXIMUM CURRENT VALUE AT DIFFERENT RATES

This application is a continuation of application Ser. No. 08/100,760, filed Jul. 30, 1993, now U.S. Pat. No. 5,483,390.

BACKGROUND OF THE INVENTION

1. Field of the Invention

The present invention relates to video tape recorder heads, more particularly to a method and apparatus for rapidly switching a read head to a read mode once a write operation has been carried out.

2. Discussion of the Related Art

Various types of video tape recorders allow for counting a tape's length in real time. To achieve this function, while the tape is being recorded, a rectangular signal, having approximately a 25-Hz frequency, is simultaneously recorded by a control head on a control track of the tape. Thus, when the tape is played back, the rectangular control signal provides a real time count of the length of the tape, independent of the tape speed (fast search, slow motion, normal reading mode . . . ). Additionally, some video tape recorders use the control signal in order to simultaneously record marks on the tape, which are also referred to as indexes. The beginning of a sequence marked by the index may then be searched for, for example, in a fast search mode.

FIG. 1 shows an exemplary rectangular control signal C recorded on a tape and a waveform H output by a read head reading the signal C.

The control signal C, as shown in FIG. 1, is cyclical. As is shown in FIG. 1, the first two periods of the signal have a 50%-duty cycle corresponding to a situation where the tape is not marked with an index. For the third period, signal C has a 27.5%-duty cycle, and for the fourth period a 60%-duty cycle. The 27.5% and 60% duty cycles are standardized ratios corresponding to binary values "1" and "0", respectively. Thus, in order to mark the tape with a digital index of n-bits, a combination of 27.5% and 60% duty cycle signals is recorded for n successive periods of signal C.

The control head behaves like a derivator, deriving the control signal C. Thus, as shown, signal H provided by the control head comprises a positive pulse at each rising edge of signal C and a negative pulse at each falling edge of signal C. The rising edges of signal C are separated by a period length. By detecting the positive pulses of signal H (when a positive threshold Vs is exceeded), the tape's playing time can be counted in real time. In addition, the falling edges of signal C are modulated with respect to the rising edge and correspond to the above-mentioned duty cycles. Thus, by detecting the negative pulses of signal H (when a negative threshold −Vs is exceeded), it is possible to check whether the control signal C includes binary data 0, 1, or not.

The marking of an index on the tape when, for example, a user desires to spot a sequence on the tape, is made as follows. A marking circuit, operating in a read mode, detects a rising edge of signal C, switches to a write mode, writes a high value during the required time interval (corresponding to 27.5% or 60% of the period), and then writes a low value, at least during a time interval corresponding to 60% of the period in case a high value was previously written during 27.5% of the period. Then, the marking circuit must rapidly switch again to the read mode in order to read the next rising edge of signal C. The transition from the write mode to the read mode raises problems for demagnetizing the read head and stabilizing a read amplifying circuit so that parasitic pulses are not recorded on the tape and so that the next rising edge of the control signal is correctly detected. These problems are described in more detail with reference to FIG. 2.

FIG. 2 is a schematic diagram of a conventional control circuit including the read head 10. A terminal A of the read head 10 is connected to a non-inverting input V+ of a high gain differential amplifier 12, and a second terminal B of the read head 10 is connected to the inverting input V− of amplifier 12. Input V+ of amplifier 12 is biased by a resistor R1 connected to a reference voltage Vref which is set to be approximately equal to half a supply voltage VCC. Input V− of amplifier 12 is further connected to ground through a capacitor C1 and to an output H of the amplifier 12 through a resistor R2. The specific connections of amplifier 12 regulate a quiescent voltage output by the amplifier to a value approximating Vref, independent of an offset voltage input to the amplifier. A time constant R2×C1 of the resistor, capacitor combination is selected so as to obtain, across capacitor C1, a constant voltage substantially equal to the mean output voltage H of amplifier 12.

Output H of amplifier 12 is connected to a hysteresis comparator 14 having a high threshold value Vs and a low threshold value −Vs, as shown in FIG. 1. The comparator 14 detects the positive and negative voltage pulses of signal H. If the quiescent voltage of amplifier 12 was not regulated as described above, it could vary as a function of the input offset voltage which, in turn, significantly varies as a function of temperature. Without such regulation, the comparator 14 might not be able to detect the positive or negative pulses of signal H. The output of the comparator 14 is used by counting circuits (not shown) for counting, in real time, the unwinding of the tape and for detecting the indexes recorded on the tape.

Terminal B of the read head 10 is also connected to voltage Vref through a switch S1. Terminal A is also connected to voltage VCC through a switch S2 and to a current source I1 through a switch S3. Additionally, terminal A is connected to a switch S4 connected in series to an adjustable current source I2. The adjustable current source I2 is controlled by an inverting amplifier 76, an input of the inverting amplifier being connected to the voltage supply VCC through a current source I3 and to ground through a capacitor C2. Capacitor C2 can be shorted to ground by a switch S5.

Resistor R2 can be shorted through a switch S6. The output of comparator 14 can be set to a high impedance through a switch S7.

Switches S1–S7 are controlled by a control circuit (CTRL) 18, in a way described hereinafter, to set the head to read or write mode and, in the write mode, to record on the tape a binary value "0" during the activation of a signal B0, or to record a binary value "1" during the activation of a signal B1. The sequencing of switches S1–S7 is determined by the control circuit 18 as a function of a voltage across capacitor C2, wherein the capacitor C2 together with source I3 and switch S5 comprises a voltage ramp generator.

FIG. 3 shows the waveforms of various signals that appear in the circuit of FIG. 2 when it is desired to write a binary "0" value on the tape. The given example corresponds to the writing of a square wave having a 60% duty cycle, that is, to the writing of a binary value "0".

Referring to FIG. 3, curve B0 represents the waveform of signal B0 for the writing of a binary "0" Curve C represents the waveform of the control signal to be recorded on the tape. Curves S1–S7 represent the control signals to be applied to switches S1–S7, respectively, a high level of the signals corresponding to a switched-on condition. Curve VC2 represents the voltage across the ramp generator capacitor C2. Curve VH represents, in solid lines, the voltage signal V+ at the non-inverting input of amplifier 12 (terminal A), and, in dashed lines, the voltage signal V− at the inverting input of amplifier 12 (terminal B). The voltage V− also represents the voltage signal across the capacitor C1. Curve $I_{10}$ represents the current in the read head 10. Curve H represents the output voltage signal of amplifier 12.

The time interval during which signal C is at a high level (corresponding to 27.5% or 60% of the period of signal C) is not to scale, as shown in FIG. 3, in order to better show the major-events occurring for the last 40% of the period of signal C.

At a time t0, an order to write a "0" is provided to the tape in the form of a pulse B0. At t0, the control circuit is in the read mode (signals S1–S6 are at a low level and signal S7 at a high level) and remains in the read mode until the occurrence of the next rising edge of the control signal C, which occurs at a time t1.

At a time t2, prior to the possible occurrence of a falling edge of the control signal C (corresponding to 27.5% of the period of signal C after time t1 for a recorded binary value 1), the write mode of the tape starts operating. Simultaneously, switch S7 is turned off so that the variations of the output signal H of amplifier 12 are not taken into account during this write mode and during a subsequent transition mode to be discussed below. The write mode comprises two phases, labeled as 1 and 2 in curve $I_{10}$.

Phase 1 includes allowing a positive current to flow through head 10 so as to write a high level signal on the tape. To achieve this function, switch S1 is turned on in order to connect terminal B of the read head 10 to the voltage Vref; switch S2 is turned on in order to connect terminal A of the read head 10 to the voltage supply VCC. Thus, a voltage VCC-Vref is applied across head 10. Switch S1 is turned on in order to maintain a constant voltage across capacitor C1 so that the voltage is not affected by any subsequent variations of the output voltage H of amplifier 12. Before switch S1 state is turned on, voltage V− across capacitor C1 is, as shown by curve $V_H$, slightly higher than voltage Vref. The voltage applied to the read head 10 during this phase generates a positive current in the read head 10 which writes on the tape a high level value of the control signal. Phase 1 lasts up to a time t3 occurring, in the present example, at a time corresponding to 60% of the period of signal C. In the alternative, for the write operation of a binary value 1 on the tape (not shown), time t3 occurs at a time corresponding to 27.5% of the period of signal C.

At a time t3, phase 2 of the write mode begins. Phase 2 consists in writing a falling edge of the control signal C. In all cases (writing of a binary value 0 or 1 on the tape), phase 2 may be slightly prolonged beyond 60% of the period of signal C, for example, up to 61%. Alternatively, during the writing operation of a binary value 1 (not shown), phase 2 lasts from 27.5% to 60% of the period of signal C in order to erase a possible binary value 0 that would have been previously recorded. Switch S2 is turned off and switch S3 is turned on. Switch S3 connects terminal A of the read head 10 to ground through the current source I1. Thus, a negative current is imposed on the read head 10 that writes a low value on the tape. Voltage V+ drops to a low value corresponding to the flow of a negative current through the head.

At a time t4, the write mode stops and a transition mode starts in order to rapidly switch from the write mode to the read mode before the occurrence of the next rising edge of signal C. The transition mode comprises three successive phases, labeled as 3 to 5 in curve $I_{10}$. Phase 3 is an undesired latency phase. After the write mode, a current in the inductive component of head 10 must be restored sufficiently slowly to a zero value so that no overvoltage is generated and no parasitic pulse is written on the tape. To achieve this function, it is desirable to impose to the read head 10 a current ramp having a decreasing absolute value. At time t4, switch S5 is turned off, thereby allowing capacitor C2 to be charged by the current source I3. Voltage VC2 across capacitor C2 thus starts increasing linearly. At time t4, switch S3 is also turned off, and switch S4, which connects the variable current source I2 to terminal A of the head 10, is turned on. Since the variable current source I2 is negatively controlled by voltage VC2, the current I2 decreases in absolute value as a function of increasing voltage VC2. Current I2 decreases from a maximum theoretical value I2max selected as close as possible to value I1 of the current present in head 10 at the end of phase 2. However, the value I2max must be chosen higher than I1 in order to prevent, due to manufacturing differences and temperature variations, the current I2max from becoming lower than I1, which would generate a current step in the head 10 and result in a writing of a parasitic pulse on the tape. Thus, at time t4, and until current I2 reaches value I1, source I2 is saturated, that is, the head 10 consumes a current lower than the current that source I2 tends to provide. Since the slope of current I2 is low, phase 3 is long-lasting.

At a time t5, the current of source I2 reaches value I1, and phase 4 provided for effectively discharging the current accumulated in-the head 10 starts.

At a time t6, the current in head 10 is cancelled. Time t6 is approximately detected when voltage VC2 reaches an adequately selected threshold value V1. At time t6, the voltage signal V+ is beyond its initial value and voltage V− (that is, the voltage across capacitor C1) is below its initial value. The function of phase 5 is to restore as fast as possible the input voltages V+, V− of amplifier 12 to their initial values. In phase 5, switches S1 and S4 are off. Amplifier 12 thus returns to its initial configuration for regulating the quiescent voltage. Additionally, switch S6 that shorts resistor R2 is turned on. Thus, an equilibrium state of amplifier 12 is very rapidly reached due to the fast charging of the capacitor C1. As is shown in FIG. 3, the voltage signals V+ and V− rapidly recover their initial values.

Phase 5 must be sufficiently long so that voltages V+ and V− recover their initial values before the end of this phase. Phase 5 ends at a time t7 determined by the fact that the voltage VC2 across capacitor C2, that is still charged by source I3, reaches an adequately selected threshold value V2. Switch S6 is turned off and amplifier 12 is restored to its initial configuration operable for the slow regulation of the quiescent voltage. The read mode could be restored at time t7. In fact, it is restored at a subsequent time t8 when switch S7 is turned on again in order to enable the output of comparator 14.

A problem with the above described operation is that, due to the abrupt switching off of switch S6, a biasing current i of amplifier 12 has sufficient time for charging capacitor C1 before the regulation of the quiescent voltage begins. As represented by curve VH, voltage V− increases slightly, then starts decreasing slowly due to the quiescent voltage regulation.

As represented by curve H, the output of amplifier 12 is the sum of the voltage signals (V+)−(V−). The output of the amplifier is not accounted for between time periods t2 and t8 due to the fact that switch S7 remains off between these time intervals. Time t8 is determined by the fact that voltage VC2 across capacitor C2 reaches a threshold value V3 slightly lower than the end value reached by voltage VC2 (approximately equal to VCC).

At a time t9, the next rising edge of signal C occurs. As represented by curve H, the output voltage of amplifier 12 is, at time t9, still, below its quiescent value, due to the parasitic charging of capacitor C2 by current i. If at the time t9 the output voltage of amplifier 12 is still too far from its quiescent value, the pulse corresponding to the rising edge of signal C may not be detected by amplifier 14. In practice, less than 40% of the period of signal C, i.e., approximately 15 milliseconds, is available to stabilize the output of amplifier 12 to an adequate value (allowing for the detection of the next rising edge of signal C) after a write operation.

However, the present invention is directed to lessening the time required to stabilize the read head after a write mode, which becomes difficult with the conventional above-described circuit.

SUMMARY OF THE INVENTION

An object of the present invention is to provide a switching circuit for rapidly switching between a read and a write mode of a read head.

The invention is based on the above-mentioned detailed analysis of a conventional circuit and is directed to an apparatus for accelerating a decrease of a current output by a source I2 during a latency between the write and read mode phase and an apparatus for providing progressive control of a switch shorting out a resistor between an inverting input and an output of a differential amplifier upon a detection of a threshold voltage.

More particularly, the invention provides a device for switching the read head from the write mode to a read mode, including: a voltage ramp generator for generating and outputting a voltage ramp, after the write operation and a variable current source for discharging an initial current in the read head after the write operation, a decrease of a current output by the current source being controlled proportionally to the voltage ramp between a beginning of the voltage ramp and a first ramp threshold voltage value, and wherein the current source is set to have an initial maximum value higher than the initial current of the read head 10. According to the present invention, the apparatus includes a circuit for accentuating the ramp slope between the beginning of the ramp and a first time frame when the current output by the controllable current source becomes equal to the current present in the read head.

The circuit for generating the voltage ramp includes a capacitor charged through a first constant current source. The circuit for accentuating the slope further includes a second constant current source having an output current value higher than that of the first constant current source, and a switch for connecting the second current source in parallel with the first current source between the beginning of the voltage ramp and the time when the current of the variable current source becomes equal to the initial current present in the read head.

According to an embodiment of the invention, the circuit for accentuating the slope also includes components for detecting a saturation state of the variable current source, and for controlling the switch when the variable current source is saturated.

According to an embodiment of the invention, the circuit for accentuating the ramp slope also includes a detection transistor serially connected between the variable current source and an input of a current mirror; an emitter of the transistor is connected to the variable current source, an output of the current mirror feeds the capacitor, and a base of the transistor is provided with a voltage at least equal to the sum of the saturation voltage of the variable current source plus a voltage drop between the base and emitter of the transistor.

The read head is connected between a first and second input terminals of a differential amplifier, the second input terminal also being connected to a constant voltage through a second capacitor and to an output of the amplifier through a resistor. A switch for switching the resistor to a low value, at least between the above-mentioned threshold and a second ramp threshold voltage, is also provided.

According to an embodiment of the invention, the apparatus further includes a detector for detecting the second threshold voltage End for providing, in the vicinity of this threshold, a progressive control of the switch shorting out the resistor between the amplifier input and output.

According to an embodiment of the invention, the switch includes two switching transistors of the same type disposed in parallel with the resistor and arranged such that dissimilar terminals are connected together.

According to an embodiment of the invention, the detector for detecting the second threshold includes two transistors connected as a differential amplifier stage, including a first input which receives a voltage equal to the second threshold and a second input which receives the voltage ramp; a current mirror for supplying a base of each switching transistors with a current proportional to the current flowing in either one of the differential stage transistors.

According to an embodiment of the invention, the current mirror is disposed so as to duplicate in the bases of the switching transistors the current flowing in either one of the differential stage transistors.

The foregoing and other objects, features, aspects and advantages of the invention will become apparent from the following detailed description of the present invention when taken in conjunction with the accompanying drawings.

DETAILED DESCRIPTION

Figure 1:
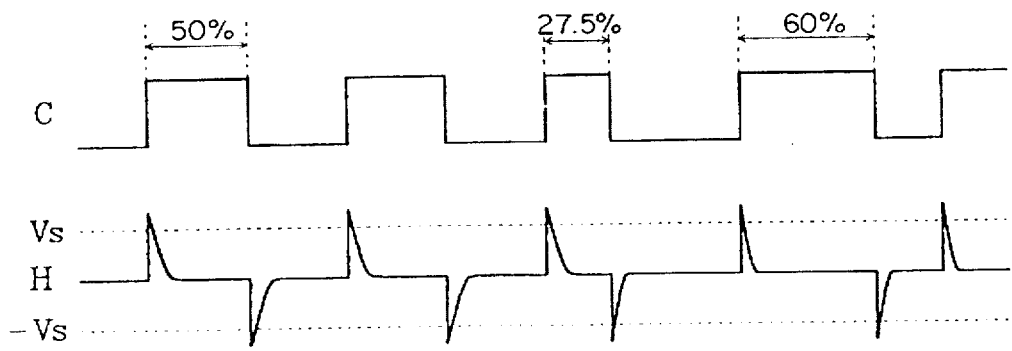
FIG. 1 is a signal diagram according to the prior art embodiment.
Figure 2:
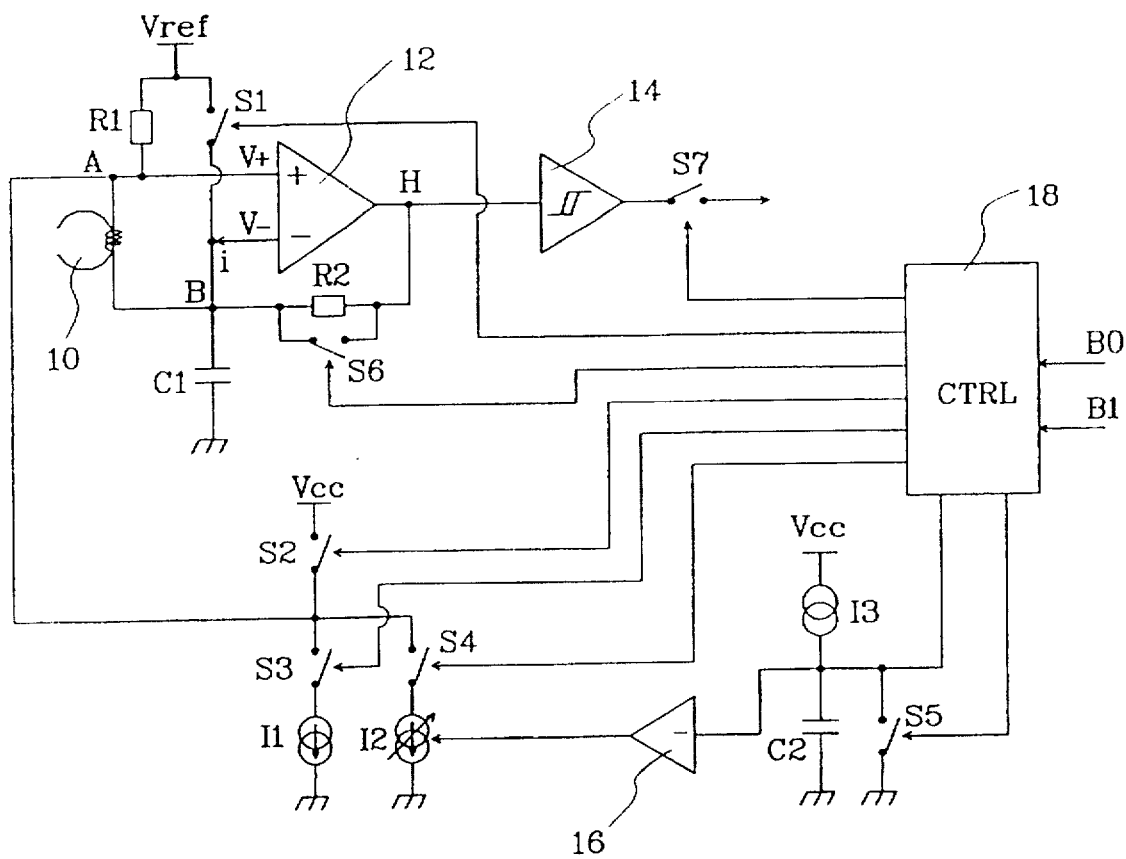
FIG. 2 is a schematic diagram of a prior art control circuit.
Figure 4:
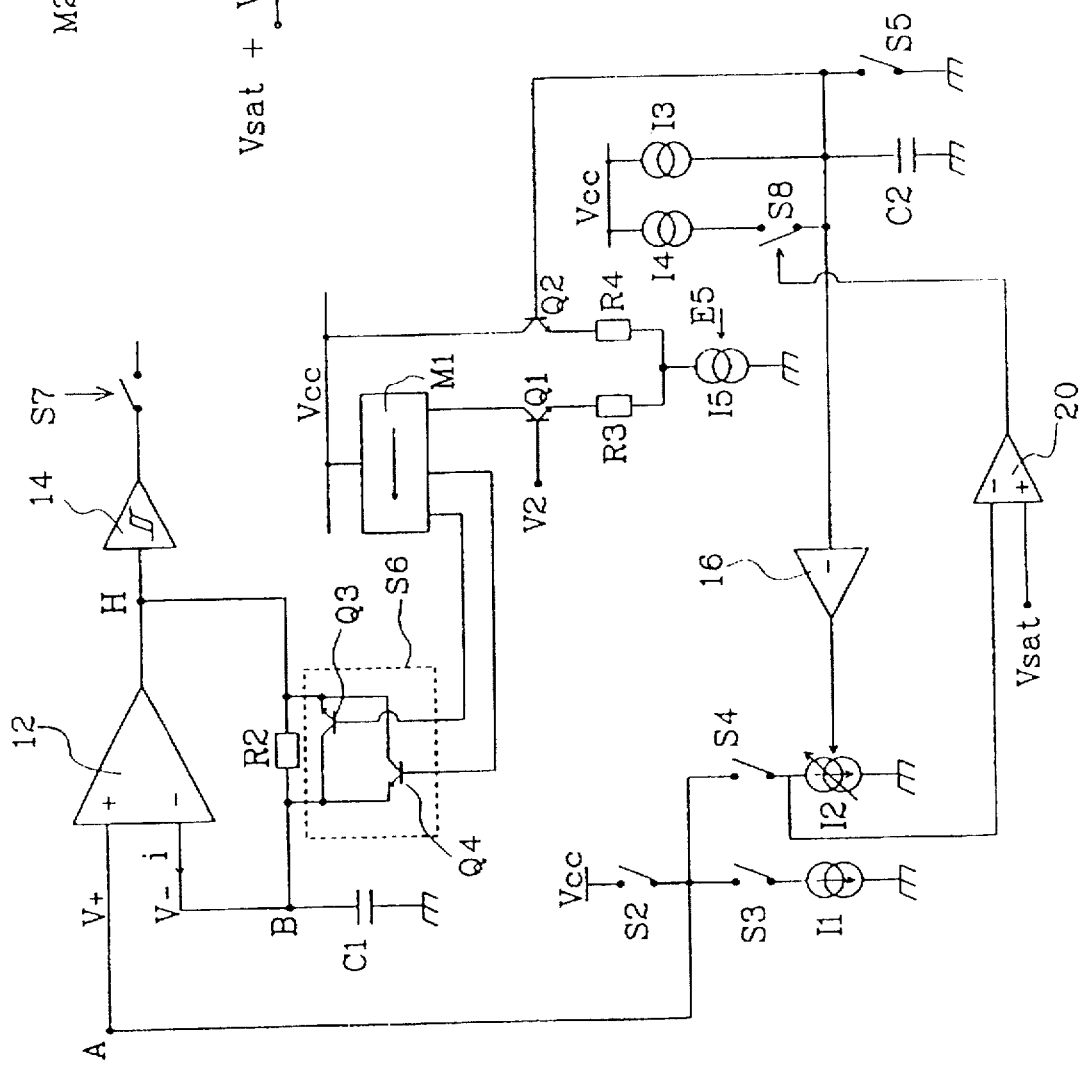
FIG. 4 is a schematic diagram of the preferred embodiment of the present invention.

In FIG. 4, the same components as are shown in FIG. 2 are designated with the same reference numbers. In order to simplify the drawing, only some of the components of FIG. 2 are shown again.

According to the present invention, an inverting input of a comparator 20 is connected between a switch S4 and a controlled current source I2. A non-inverting input of the comparator 20 is connected to a voltage (Vsat) substantially equal to the saturation voltage of the current source I2. The output of comparator 20 is connected to and controls a switch S8 disposed in series with a current source I4. Source I4 and switch S8 are disposed in parallel with a current source I3 connected in series to charging capacitor C2. The absolute value of the current provided by the current source I4 is larger than the current provided by the source I3.

According to the preferred embodiment of FIG. 4, as described with reference to FIG. 6, a latency phase between a write mode and a read mode of the read head is reduced to a negligible duration.

Figure 6:
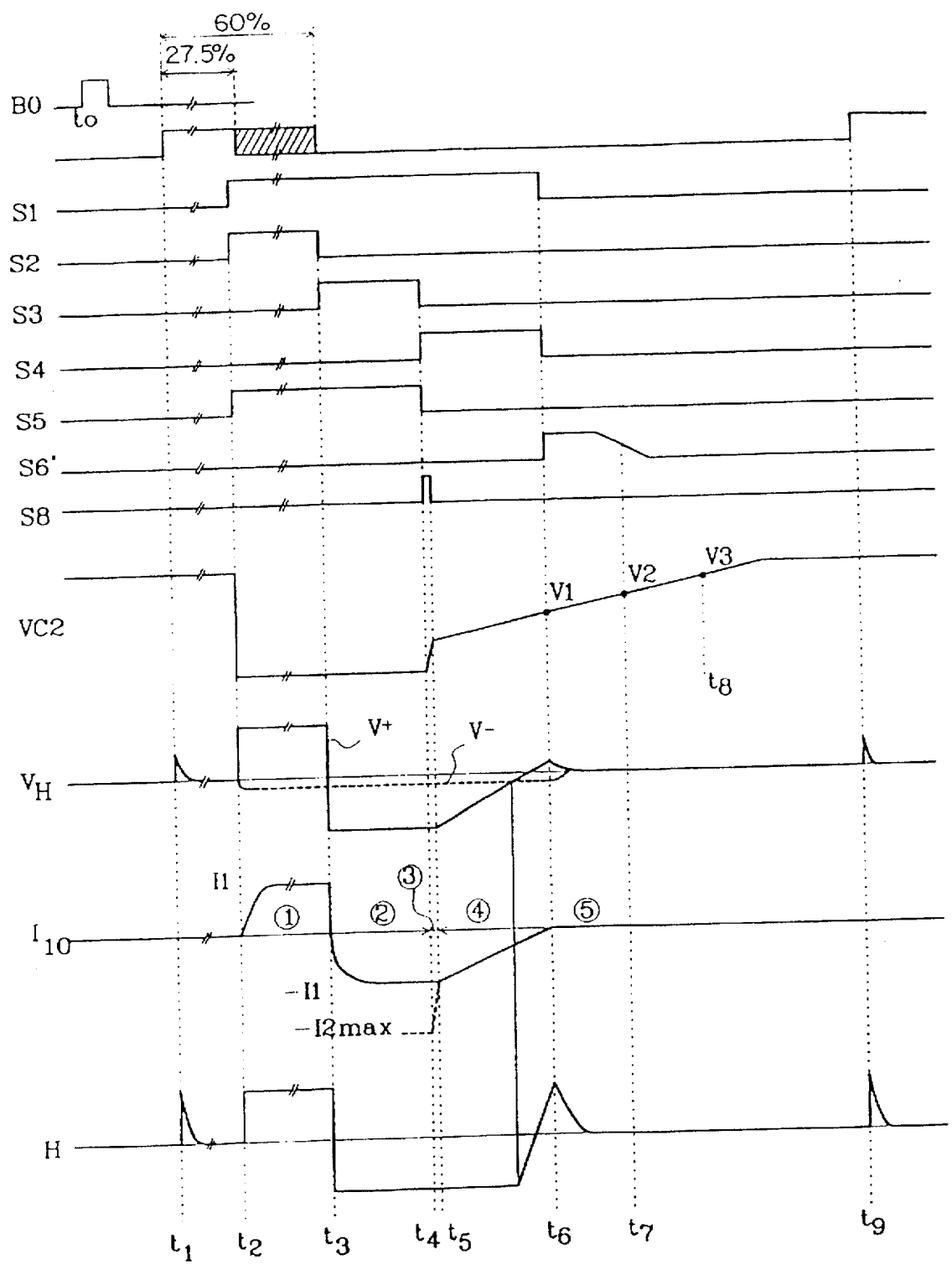
FIG. 6 is a signal diagram of the various signals of the embodiment of the circuit of FIG. 4 during the transition from the write mode to the read mode.

According to another aspect of the present invention, a differential amplifier stage including two NPN transistors Q1 and Q2, compares a voltage across capacitor C2 with a threshold voltage V2 that can be set to have a value identical to the voltage shown in FIG. 6. Transistors Q1 and Q2 are connected through emitter resistors R3 and R4 to a current source I5, which is connected to ground. Source I5 can be enabled or disabled by a signal E5. Resistors R3 and R4 are useful for limiting and linearizing the gain of the differential amplifier stage. The threshold voltage, V2 is applied to a base of transistor Q1, and the voltage VC2 across capacitor C2 is applied to the base of transistor Q2. A collector of transistor Q2 is connected to a supply voltage VCC and a collector of transistor Q1 is connected to the input of a current mirror M1, which is in turn connected to voltage VCC. The current mirror M1 includes two outputs feeding a base of two NPN transistors Q3 and Q4 disposed in parallel, and arranged such that dissimilar terminals of the transistors are connected. Transistors Q3 and Q4 comprise switch S6 for shorting out the resistor R2.

As will be seen with reference to FIG. 6, this circuit provides a mechanism for substantially cancelling any variation of a voltage signal V− at the end of phase 5 of the prior art control circuit.

Figure 5:
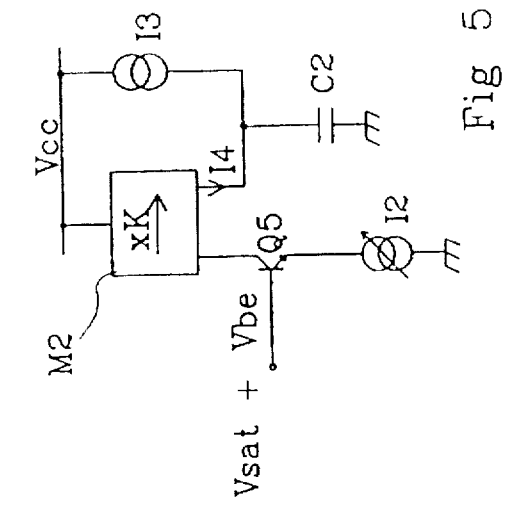
FIG. 5 represents in more detail an embodiment of a detector of the circuit of FIG. 4.

FIG. 5 is a schematic diagram of an embodiment of a detector assembly comprising the comparator 20, the current source I4 and a detector switch S8. Capacitor C2 is charged by the current source I3 and, if required, also by an output of a current mirror M2 connected to the supply voltage VCC. An NPN transistor Q5 is disposed in series between the controlled current source I2 and an input of the current mirror M2. Transistor Q5 receives at its base a signal which is the sum of the above-mentioned voltage Vsat and of a voltage Vbe (base-emitter voltage of transistor Q5). With this arrangement, when the voltage across the current source I2 is lower than Vsat, that is, when source I2 is saturated, transistor Q5 is conductive and the difference between the current provided by the current source I2 and current $I_{10}$ is provided to the input of current mirror M2. This input current can be multiplied by a factor K in the current mirror M2 and provided to capacitor C2. When the current source I2 is not saturated, transistor Q5 does not conduct and capacitor C2 is charged by the current source I3 only.

Figure 3:
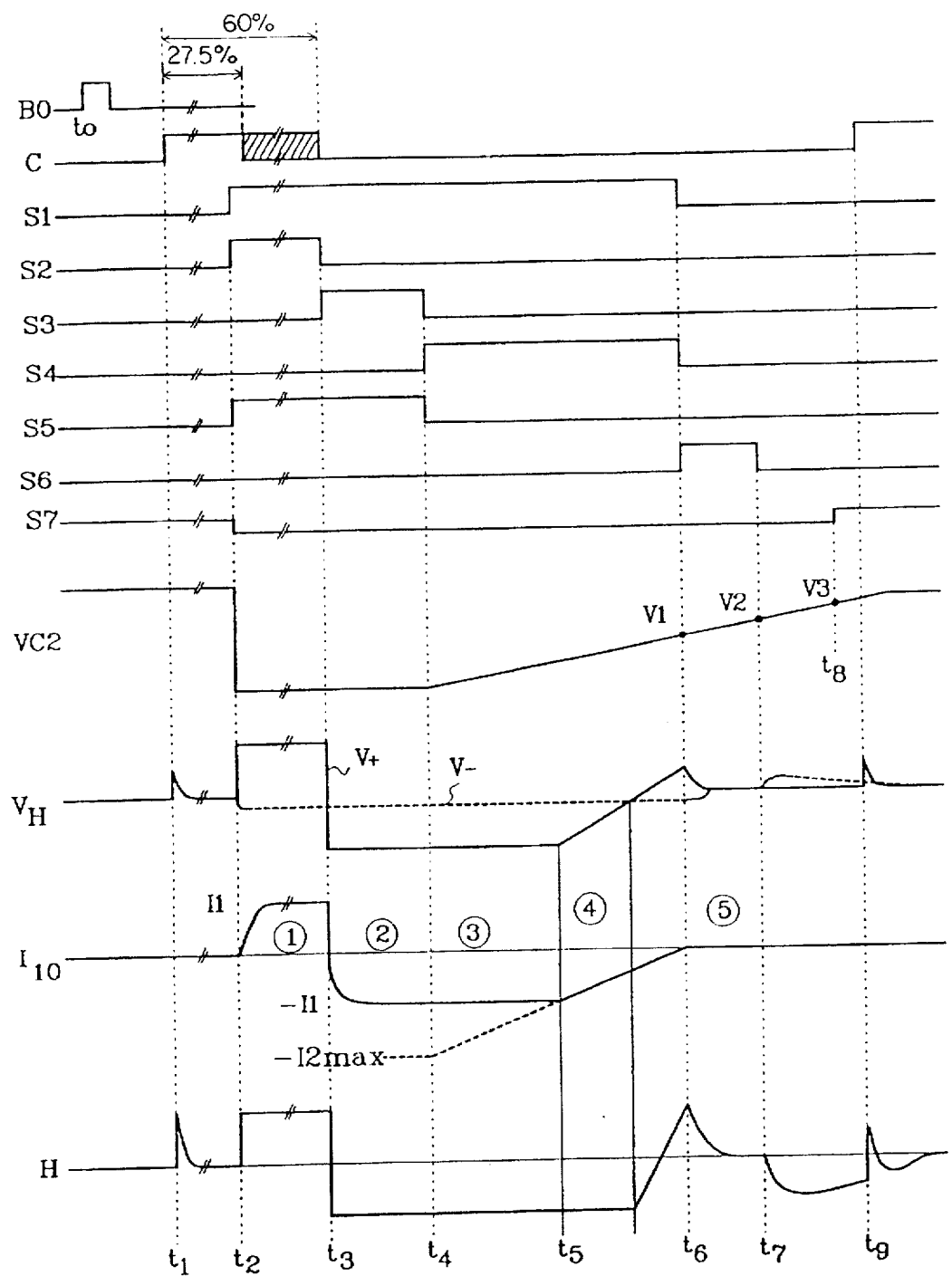
FIG. 3 is a mode detailed signal diagram of the prior art control circuit.

FIG. 6 shows the waveforms of the various signals of the circuit of FIG. 4 in a situation identical to that of FIG. 3. FIG. 6 shows again the same curves, times and phases, that are designated with the same references as in FIG. 3.

The writing of a binary "1" or a "0" value on the tape, occurring between times t0 and t4, is made as described with reference to the prior art circuit of FIG. 3. Hence, phase 1 of the present invention for writing a high value and phase 2 for writing a low value on the tape, are identical to that of the prior art circuit.

At time t4, it is desired to charge capacitor C2 in order to generate a voltage ramp and to progressively discharge an initial current in the read head according to a current output by the controlled current source I2. Switch S5 is turned off and switch S4 is turned on. The current source I2 is initially saturated because it is designed to have an initial absolute value I2max, higher than the initial value I1 of the current present in the read head 10 at time t4. The saturation state of current source I2 is detected by comparator 20 that turns switch S8 on, thus setting in parallel the high value current source I4 with the current source I3. Thus, the voltage across capacitor C2 very rapidly charges. Simultaneously, the current theoretically provided by source I2 decreases so as to rapidly reach the current value I1 at time t5. The source I2 is then no longer saturated, which is detected by the comparator 20 which then turns switch S8 off. The capacitor C2 is then charged solely by the current source I3 during a phase 4, an operation of the present invention is identical to the prior art circuit.

Thus, the present invention significantly decreases the length of the latency phase 3 of the prior art embodiment.

At a time t6, the current source I5 of the differential amplifier stage Q1, Q2 is enabled. Stage Q1, Q2 is then saturated because the base voltage V2 of transistor Q1 is sufficiently higher than the base voltage VC2 of transistor Q2. Transistor Q1 derives the whole current of source I5. The current of transistor Q1 is duplicated and fed to the bases of transistors Q3 and Q4 comprising switch S6. One of the transistors Q3, Q4, will as a function of the polarities of the voltages signals V− and H, saturate and short out resistor R2. An initial stabilization phase 5, identical to phase 5 of FIG. 3, is obtained.

When the voltage VC2 approaches the threshold voltage V2, the differential amplifier stage Q1, Q2 enters a linear mode. As voltage VC2 continues increasing, the current in transistor Q1 decreases whereas the current in transistor Q2 increases. Thus, the current provided to the bases of transistors Q3, Q4 of switch S6 decreases, and transistors Q3, Q4 are progressively pinched off. Transistors Q3, Q4 are completely biased off when the voltage VC2 reaches a value sufficiently high with respect to V2. Then, the differential stage Q1, Q2 is saturated and the transistor Q2 derives the whole current of source I5.

Thus, resistor R2 is progressively switched from a short circuit to its actual resistance value, which leaves time for the regulation loop of the quiescent voltage to compensate for the charging of capacitor C1 by the polarization current i. As shown in FIG. 6, about time t7 of the progressive switching, there is practically no variation of the voltage signal V−. Thus, the next rising edge of signal C can occur any time after time t7. Thus, the combination of both the circuit for decreasing the latency phase 3 and the circuit for progressively switching the resistor R2 provides a significant decrease of the required time for switching head 10 from the write mode to the read mode.

As was the case of the prior art circuit of FIG. 3, the output of amplifier 12 is enabled when voltage VC2 reaches the threshold value V3. The control signal E5 of source I5, as above indicated, is enabled at time t6, and can be disabled when transistor Q2 derives the whole current of source I5, for example, at time t8 when the output of comparator 14 is enabled.

Signals S1–S5 and S7 are conventionally provided by the control circuit 18 of FIG. 2. Those skilled in the art will be capable of fabricating a circuit providing a suitable enabling signal E5, for example with a switch disposed in series with source I5 and controlled through a window comparator having threshold values V1 and V3. Source I5 could be permanently enabled, which would cause switch S6 to be on from time t2. This would impair the output H of amplifier 12, which is unimportant since this output is not taken into account between times t2 and t8.

As is apparent to those skilled in the art, various modifications can be made to the above disclosed preferred embodiments. More particularly, for example, with respect, to fabrication of the current sources and switches associated.

Having thus described one particular embodiment of the invention, various alterations, modifications, and improvements will readily occur to those skilled in the art. Such alterations, modifications, and improvements are intended to be part of this disclosure, and are intended to be within the spirit and scope of the invention. Accordingly, the foregoing description is by way of example only and is not intended as limiting. The invention is limited only as defined in the following claims and the equivalents thereto.

What is claimed is:

1. An apparatus for reducing transition time for a magnetic head to switch from a write mode to a read mode, the magnetic head conducting a write current during the write mode, the apparatus comprising:

a current source, coupled to the magnetic head to receive the write current, that limits a current through the current source to a value less than a maximum current value of the current source, the maximum current value having an initial value greater than the write current, the current source having a control input that receives a control signal to vary the maximum current value; and means for providing the control signal to the current source to reduce the maximum current value from the initial value to a value equaling the write current at a first rate, and from the value equaling the write current to a value below the write current at a second rate, the first rate being greater than the second rate.

2. The apparatus of claim 1, wherein the means for providing include means for detecting a saturation condition of the current source and for reducing the maximum current value at the first rate when a saturation condition is detected and for reducing the maximum current value at the second rate when a saturation condition is not detected.

3. A method for reducing transition time for a magnetic head to switch from a write mode to a read mode, the magnetic head conducting a write current during the write mode, the magnetic head being coupled to a current source such that the write current may be conducted through the current source, the current source limiting a current through the current source to a value less than a maximum current value, the maximum current value having an initial value greater than the write current, the current source having a control input that receives a control signal to vary the maximum current value, the method comprising the steps of:

providing the control signal to the current source to reduce the maximum current value from the initial value to a value equaling the write current at a first rate; and providing the control signal to the current source to reduce the maximum current value from the value equaling the write current to a value below the write current at a second rate, the first rate being greater than the second rate.

4. The method of claim 3, further comprising a step of detecting a saturation condition of the current source.

5. An apparatus for reducing transition time for a magnetic head to switch from a write mode to a read mode, the magnetic head conducting a write current during the write mode, the apparatus comprising:

a current source, coupled to the magnetic head to receive the write current, that limits a current through the current source to a value less than a maximum current value of the current source, the maximum current value having an initial value greater than the write current, the current source having a control input that receives a control signal to vary the maximum current value;

a control circuit having an output coupled to the control input of the current source to provide the control signal to the current source and having an input that receives a saturation detection signal; and a saturation detection circuit having an input coupled to the current source to detect a saturation condition of the current source and having an output coupled to the input of the control circuit to provide the saturation detection signal.

6. The apparatus of claim 5, wherein the control circuit is adapted and arranged to provide the control signal to reduce the maximum current value from an initial value to a value equaling the write current at a first rate when a saturation condition is detected, and to provide the control signal to reduce the maximum current value from the value equaling the write current to a value below the write current at a second rate when a saturation condition is not detected, and wherein the first rate is greater than the second rate.

7. The apparatus of claim 5, wherein the saturation detection circuit includes a comparator that compares a voltage at an input of the current source with a saturation threshold voltage level.

* * * * *

UNITED STATES PATENT AND TRADEMARK OFFICE
CERTIFICATE OF CORRECTION

PATENT NO. :   5,724,201

DATED       :   March 3, 1998

INVENTOR(S):   Jean-Luc Jaffard and Yann Desprez-Le Goarant

It is certified that error appears in the above-identified patent and that said Letters Patent is hereby corrected as shown below:

Title page, item [54] and col. 1, should read:

METHOD AND APPARATUS FOR REDUCING TRANSITION TIME FOR A MAGNETIC HEAD TO SWITCH FROM A WRITE MODE TO A READ MODE BY REDUCING A MAXIMUM CURRENT VALUE AT DIFFERENT RATES

Signed and Sealed this

Fifth Day of May, 1998

*Attest:*

BRUCE LEHMAN

*Attesting Officer*   *Commissioner of Patents and Trademarks*